United States Patent [19]

McAllister, Jr.

[11] 4,227,933

[45] Oct. 14, 1980

[54] IMPERMEABLE MEMBRANE CONTAINING TRINIDAD LAKE ASPHALT AND METHOD OF ACHIEVING SAME

[76] Inventor: LeRoy H. McAllister, Jr., R.R. 1, Zionsville, Ind. 46077

[21] Appl. No.: 969,710

[22] Filed: Dec. 15, 1978

Related U.S. Application Data

[63] Continuation-in-part of Ser. No. 814,688, Jul. 11, 1977, abandoned.

[51] Int. Cl.³ ............................................ C08L 95/00
[52] U.S. Cl. ............................. 106/281 R; 106/280; 106/282; 106/283; 106/278; 427/138
[58] Field of Search .................... 106/280, 281 R, 283, 106/282, 278; 427/138

[56] References Cited

U.S. PATENT DOCUMENTS

| | | | |
|---|---|---|---|
| 1,057,667 | 4/1913 | Pine et al. | 106/280 |
| 3,870,426 | 3/1975 | Kietzman et al. | 106/282 |

*Primary Examiner*—Howard E. Schain
*Attorney, Agent, or Firm*—Robert A. Spray

[57] ABSTRACT

The employing of finely-divided and naturally-occurring particulate matter of Trinidad Asphalt to lock or hold the aggregate filler mixture of the pavement mix in position, almost entirely filling the mix with soft bitumen, permitting subsequent compacting (as by rolling) to a state of substantial voidlessness, and thereby achieving a pavement which is both strong with respect to bearing strength yet soft and/or flexible with respect to its tendency to crack, and which will optimize a sort of self-rehealing of the membrane if cracking should start to occur.

8 Claims, No Drawings

IMPERMEABLE MEMBRANE CONTAINING TRINIDAD LAKE ASPHALT AND METHOD OF ACHIEVING SAME

This is a Continuation-in-part of U.S. Patent Application, Ser. No. 814,688, filed July 11, 1977, by the same inventor LeRoy H. McAllister, Jr., now abandoned.

This invention relates to the advantageous invention or discovery of a novel formulation of an impermeable pavable membrane which provides an improved impermeable and stable membrane for use wherever is required waterproofing of surfaces which are to be subsequently paved.

The permeability of conventional asphalt pavement, by the moisture of leaking water and/or salt solutions which appear on various paved surfaces due to many causes, has long caused great difficulties, particularly that of corrosion and weakening of reinforcing steel of concrete structures. The leakage through concrete parking structures causes not only that disadvantage but also causes damage to rental areas below.

Advantages of the present invention include that of being mixable with conventional and generally-available mixing equipment, with commonly-used and conventional gradation of sand and stone size, and pavable with conventional paving equipment; yet the invention advantageously provides a desired substantially impermeable membrane for the pavement or other installation, sufficiently strong for its purpose.

Prior art in this field is represented by the U.S. Patent of Kietzman and Tocci, U.S. Pat. No. 3,870,426, of 1975. That patent describes not only the particulars of the problems long encountered, but illustrates various prior art attempts at solution; and that patent itself specifies another of the attempted solutions.

However, the said patent of Kietzman et al. deals wholly with the use of asbestos fibers, as an extra constituent, in contrast to Trinidad Asphalt; and it does not give any suggestion whatever as to the inclusion of Trinidad Asphalt in any manner or any form or for any purpose, even though the Kietzman patent expressly asserts an attempt to achieve a desirably impermeable membrane, and even though Kietzman's work was some 60 years subsequent to prior art literature such as the Pine and Ruggles U.S. Pat. No. 1,057,667, which discussed the use and nature of Trinidad Lake Asphalt.

Indeed the Kietzman patent does seem to achieve a desired impermeability; yet it fails to provide the advantages of the present invention with respect to (a) economy of its constituent materials and (b) avoidance of health hazards of personnel working with the asbestos fibers (suspected to be even carcinogenic) of the Kietzman patent composition, and (c) the relative ease of a permission of lower mixing temperatures and ease of compaction.

Further, in contrast to that of the Kietzman patent, the present invention's membrane is stronger in respect to higher bearing strength.

Still further, the present invention's membrane appears to be able to be made more voidless and thus more impermeable; and although this depends upon the proportions of constituent materials, nevertheless the present invention's membrane achieves a substantial voidlessness even at the outside limits of specified proportions of constituents.

As another contrast to the Kietzman patent, that Kietzman patent does not indicate any locking or holding type of mechanism or operativity of its asbestos fibers; and the inherent differences, between the asbestos fibers of the Kietzman patent and the present invention's use of particulate matter of Trinidad Asphalt, indicate that the impermeability-providing nature or operation of the two are significantly different.

THE PRESENT INVENTION

The present invention is the discovery or invention of employing of finely-divided and naturally-occurring particulate matter of Trinidad Asphalt to lock or hold the aggregate filler mixture of the pavement mix in position, almost entirely filling the mix with soft bitumen, permitting subsequent compacting (as by rolling) to a state of substantial voidlessness and thereby achieving a pavement which is both strong with respect to bearing strength yet soft and/or flexible with respect to its tendency to crack, and which will optimize a sort of self-rehealing of the membrane if cracking should start to occur.

In effect, the present invention combines the strength and pavability of asphaltic concrete with the resistance to cracking and the impermeability of mastics.

The advantageous achievement of both impermeability and stability by the present invention is believed to be due to the relative size and thickness details. That is, the asphalt film in asphaltic concrete is considered to be between 50 and 100 microns in thickness. The gradation of the particulate matter in Trinidad Asphalt is such that about 70% of it is less than 50 microns. Thus the larger particles of the Trinidad particulate matter, acting in conjunction with its smaller particles, co-operate to effectively block the flow of asphalt through the interstices between the aggregate.

In determining the proportions of constituents to use in any particular application, there may be required to be a compromise between cost and strength; for the cost goes down as the percentage of Trinidad goes down, but at some point the lower the Trinidad the less the strength.

The following proportions of the total membrane composition have been found to be desirable:

| | |
|---|---|
| Petroleum Asphalt | 7.5% to 10.5%(by weight) |
| Trinidad Asphalt | 1.0% to 5.5%(by weight) |
| Mineral Aggregate and Filler | 84% to 91.5%(by weight) |
| Sieve Size | %Passing |
| ¼"(or No. 4) | 100 |
| No. 10 | 80–95 |
| No. 40 | 40–65 |
| No. 80 | 20–40 |
| No. 200 | 10–16 |

In contrast to the aforesaid maximum size shown as being ¼", depending upon the thickness of the paved membrane the largest particles of the aggregate are desirably no more than about 75% of the paved membrane thickness.

Also, it is important to have the void content to be as low as a maximum of 1.5% and preferably even nearer zero; and the present invention achieves this by the proportions of constituents in the range specified above, with the petroleum asphalt as high as possible while nevertheless maintaining sufficient strength, crack-resistance, etc. (as explained above by the use of the particulate matter of Trinidad Lake Asphalt) and additional reduction in voids is achieved by compacting.

By limiting the proportional amount of total asphalt used, the bearing strength of the mix is determined by the aggregate; and high pavement strength is achieved without the use of hard asphalts which have a disadvantageous tendency of cracking.

Further, the present invention's use of the particulate matter of Trinidad Asphalt to achieve strength and impermeability allows the use of a soft asphalt which is highly resistant to cracking to almost fill the mix without losing strength.

If this strength were not obtained by the locking strength of the Trinidad's particulate matter, a harder asphalt has to be used for strength purposes but at a disadvantageous sacrifice of the cracking and pavability characteristics.

The present invention asserts no claim to the use of Trinidad Asphalt per se; after all, Trinidad Lake Asphalt is shown as known as early as 1913 by the U.S. Patent to Pine and Ruggles, U.S. Pat. No. 1,057,667.

However, the Pine et al. patent, and other prior art utilizing Trinidad Lake Asphalt, provides no suggestion of the use of Trinidad Lake Asphalt in the proportions herein specified nor the use of Trinidad Lake Asphalt to obtain strength and impermeability, nor the use of Trinidad Lake Asphalt in a composition which was substantially voidless. Even the asphaltic compositions of this inventor and his own company, prior to this invention, have not been in these proportions nor with the resulting impermeability.

Even though the patent of Pine et al. is a sheet asphalt and somewhat similar in aggregate to the mix herein specified for the present invention, extensive data published by Vokac in the 1939 *Proceedings of the AAPT* indicates a voids- contents for sheet asphalts to generally range from 2.0%-7.0%. Any pavement with a voids percentage that high cannot be considered as impermeable. Neither voidlessness nor impermeability was asserted for the pavements referred to in the patent of Pine et al.; and the inventor knows of no evidence to indicate that voidlessness nor impermeability was achieved.

Even if the Pine process achieved some small amount of interlocking effect, it was not a recognized phenomenon, nor did the Pine process utilize this phonomenum to achieve both impermeability and good strength characteristics.

A further difference from Pine et al. is that the oil employed by Pine was 14°-20° Baume' (0.97-0.92 SG) (23.5°-14.5° API). Such oil would have to be classed as a fuel oil, and apparently was a residuum of that era's atmospheric distillation process for crude oil. The present invention, in contrast, does not use fuel oil, and it would probably have a bad effect in the present invention; and thus, Pine's use of it as an apparently necessary factor helps to show additional distinction over Pine et al.

In contrast to the Pine et al. patent, the present invention uses petroleum asphalt as a second bituminous component in the mix.

In further contrast to Pine, and further indicating the conceptual differences of the present invention from any grouping of prior art disclosures such as a consideration of Kietzman and Pine together, is that although Pine mentions that Trinidad Lake Asphalt has in it particulate matter (mineral matter, clay and fine sand, 33-38% Col. 1, lines 43-44), he recognizes no interlocking nature of interlocking effect by which as a component of Trinidad Lake Asphalt it could serve to replace the disadvantageous asbestos fibers which Kietzman uses as an added ingredient.

PREPARATION OF THE MEMBRANE

In preparing the mixture which provides the impermeable membrane, a desirable procedure is as follows:

The conventional asphalt is added to the heated aggregate and filler mixture with a normal mix time. Then, the fist-sized pieces of Trinidad are added with a 5 minute mix time. This sequence is used to avoid dusty conditions when the pugmill door is opened and to provide preferential absorption of conventional asphalt by the aggregate. Inadequate mix time would result in an uneven mixing of the Trinidad. (The pugmill is a conventional apparatus forming asphaltic pavements.)

The mixture is then hauled from the pugmill to the job site, with conventional trucks, paved with a conventional paver, and rolled with a conventional roller.

A test batch is recommended, to be sure no free asphalt is present.

Mixing temperatures should be adjusted to achieve 310°-360° in the truck. It should be understood that Trinidad asphalt can be added in any convenient way, and the mixing time required will depend upon the particle size and physical state. For example, it may be introduced as a liquid or as a blended asphalt or as a powder.

The aggregate employed may be either natural or manufactured, or mixtures.

Sufficient Trinidad asphalt must be employed for its particulate matter to "lock" the aggregate-filler mixture into position and assure a minimum required pavement strength. The use of Trinidad in a proportion above that amount increases bitumen hardness which increases the tendency of the pavement to crack.

In order to produce a pavement in this manner which can be compacted to voidlessness, it is essential to use enough asphalt to almost fill all of the voids in the aggregate-filler mixtures. The total volumetric proportion of voids as being 0.1% to 0.5% appears ideal. At very low void percentages, approaching zero, the pavement behind the compacting roller has a black glass-like appearance. As voids are increased to up to 1.5%, the pavement may be, for practical purposes, still considered impermeable. Increasing voids content above 1.5%, however, increases permeability. The utilization of more total asphalt than is needed to fill the voids would create a mastic condition which would not be adequately strong nor be paveable with conventional equipment.

The impermeability of the membrane of this invention makes the paved mix have a sort of leathery nature behind the paver; and thus re-working should be kept to a minimum. Whatever re-work disadvantage this may pose in a particular application, however, it seems to be an inherent characteristic of the impermeability which is the primary overall goal of the membrane.

Another acceptable disadvantage of the impermeable membrane is its slickness in comparison to conventional pavements. Thus, if it is to be used temporarily for traffic or as a surface course (even though not recommended for such use except temporarily such as for a traffic use expedient during construction) provision for skid-resistance is desirably made.

What is claimed is:

1. An impermeable membrane formed from an asphaltic mixture of petroleum asphalt and aggregate and filler, in which Trinidad Lake Asphalt is also used in a proportion of 1.0% to 5.5% by weight, of the total membrane composition, thereby achieving a locking effect by the Trinidad Lake Asphalt which locks or holds the aggregate mixture in position, in the substantial absence of asbestos, the mechanical bearing strength thereby achieved by the particulate matter of the Trinidad Lake Asphalt thereby permitting the use of a softer combination of petroleum asphalt and Trinidad Lake Asphalt to fill the interstices of the aggregate and filler, without using an asphalt hard enough to itself provide that mechanical strength, and thereby achieving a membrane which is pavable and resistant to cracking as well as impermeable and strong.

2. The invention as set forth in claim 1 in which the constituents of the total membrane composition are used in the following ranges:

| Petroleum Asphalt | 7.5% to 10.5% (by weight) |
| Mineral Aggregate and Filler | 84% to 91.5% (by weight) |

3. The invention as set forth in claim 2 in which the aggregate and filler are used as follows:

| Sieve Size | % Passing |
| --- | --- |
| ¼"(or No. 4) | 100 |
| No. 10 | 80–95 |
| No. 40 | 40–65 |
| No. 80 | 20–40 |
| No. 200 | 10–16 |

4. The invention as set forth in claim 2 in which the largest particles of the aggregate are no more than 75% of the paved membrane thickness.

5. The invention as set forth in any of claims 1, 2, or 3, in which the proportions of petroleum asphalt, Trinidad Lake Asphalt, and aggregate and filler are such as to provide a mixture having a maximum void content of no more than 1.5%.

6. The invention as set forth in any of claims 1, 2, or 3, in which the proportions of petroleum asphalt, Trinidad Lake Asphalt, and aggregate and filler are such as to provide a mixture having a maximum void content of no more than 1.0% after compacting.

7. The invention as set forth in any of claims 1, 2, or 3, in which the proportions of petroleum asphalt, Trinidad Lake Asphalt, and aggregate and filler are such as to provide a mixture having a maximum void content of no more than 0.5% after compacting.

8. The invention as set forth in any of claims 1, 2, or 3, in which the proportions of petroleum asphalt, Trinidad Lake Asphalt, and aggregate and filler are such as to provide a mixture having a maximum void content of no more than 0.2% after compacting.

* * * * *

UNITED STATES PATENT OFFICE
CERTIFICATE OF CORRECTION

Patent No. 4,227,933            Dated 10/14/80

Inventor(s)      LeRoy H. McAllister, Jr.

It is certified that error appears in the above-identified patent and that said Letters Patent are hereby corrected as shown below:

Column 4, after line 2, but before the heading "Preparation of the Membrane", there should be inserted the following paragraph: --Moreover, the present invention differs conceptually from a consideration of Pine and Kietzman, even considered together now in retrospect, by the fact that even though Pine's Trinidad Lake Asphalt was known to have particulate matter, and even though Kietzman used particulate matter, and even though Trinidad Lake Asphalt has been long known to the art prior to Kietzman's work, no one prior to the present invention had conceived of the concept of advantageously using the particulate matter of Trinidad Lake Asphalt to achieve the strength and long-life characteristics which they impart to an impermeable membrane.--

Column 6, line 10, being line 2 of Claim 4: before "75%", insert --about--.

Column 6, line 16, which is the last line of Claim 5: before the period which follows 1.5%, insert --after compacting--.

Signed and Sealed this

Thirteenth Day of July 1982

[SEAL]

Attest:

GERALD J. MOSSINGHOFF

Attesting Officer     Commissioner of Patents and Trademarks